(12) United States Patent
Fujisawa et al.

(10) Patent No.: US 8,396,258 B2
(45) Date of Patent: Mar. 12, 2013

(54) FINGER VEIN PATTERN INPUTTING DEVICE

(75) Inventors: Yasunori Fujisawa, Ebina (JP); Yuichi Horiuchi, Hitachinaka (JP); Kyoichi Takahashi, Fujisawa (JP); Soichi Sakurai, Yokohama (JP); Naoto Miura, Kokubumji (JP)

(73) Assignee: Hitachi Ltd., Tokyo (JP)

( * ) Notice: Subject to any disclaimer, the term of this patent is extended or adjusted under 35 U.S.C. 154(b) by 1123 days.

(21) Appl. No.: 11/902,806

(22) Filed: Sep. 25, 2007

(65) Prior Publication Data

US 2008/0075332 A1 Mar. 27, 2008

(30) Foreign Application Priority Data

Sep. 25, 2006 (JP) .................. 2006-259628

(51) Int. Cl.
*G06K 9/00* (2006.01)
(52) U.S. Cl. .................. 382/115; 382/116; 382/119
(58) Field of Classification Search .................. 382/115, 382/116, 119, 165, 170, 124, 289; 348/161
See application file for complete search history.

(56) References Cited

U.S. PATENT DOCUMENTS

| | | | | |
|---|---|---|---|---|
| 5,077,803 A | * | 12/1991 | Kato et al. | 382/124 |
| 5,177,802 A | * | 1/1993 | Fujimoto et al. | 382/124 |
| 5,825,907 A | * | 10/1998 | Russo | 382/124 |
| 6,813,010 B2 | * | 11/2004 | Kono et al. | 356/71 |
| 7,245,745 B2 | * | 7/2007 | Nagasaka et al. | 382/115 |
| 7,672,488 B2 | * | 3/2010 | Miura et al. | 382/115 |
| 7,706,582 B2 | * | 4/2010 | Nagasaka et al. | 382/124 |
| 2002/0028004 A1 | * | 3/2002 | Miura et al. | 382/124 |
| 2003/0016345 A1 | * | 1/2003 | Nagasaka et al. | 356/71 |
| 2005/0047632 A1 | * | 3/2005 | Miura et al. | 382/124 |
| 2005/0254690 A1 | * | 11/2005 | Nagasaka et al. | 382/115 |
| 2007/0058841 A1 | * | 3/2007 | Miura et al. | 382/115 |
| 2008/0075332 A1 | * | 3/2008 | Fujisawa et al. | 382/115 |
| 2008/0137920 A1 | * | 6/2008 | Miura et al. | 382/124 |
| 2008/0152195 A1 | * | 6/2008 | Nagasaka et al. | 382/115 |

FOREIGN PATENT DOCUMENTS

| | | |
|---|---|---|
| JP | 2003-030632 | 1/2003 |
| JP | 2005-301552 | 10/2005 |
| JP | 2006-099493 | 4/2006 |

* cited by examiner

*Primary Examiner* — Vu Le
*Assistant Examiner* — Aklilu k Woldemariam (57) ABSTRACT

The present invention is adapted to form a finger table for supporting and locating a finger to be authenticated by touching the front part of the finger in a case, make the case closed at parts corresponding to the tip and the base of the finger to be authenticated and parts corresponding to left and right sides of the finger, make the case opened at parts corresponding to the front part and the backside of the finger, and form an imaging range of imaging means such as an imaging element in the parts corresponding to the left and right sides of the finger. With the configuration, a finger vein pattern inputting device with high operability and authentication accuracy reserved is provided.

12 Claims, 11 Drawing Sheets

FINGER VEIN PATTERN INPUTTING DEVICE

INCORPORATION BY REFERENCE

The present application claims priority from Japanese application JP 2006-259628 filed on Sep. 25, 2006, the content of which is hereby incorporated by reference into this application.

BACKGROUND OF THE INVENTION (1) Field of the Invention

The present invention relates to a biometric personal authentication technology, and more specifically to a finger vein authentication technology.

(2) Description of Related Art

As a biometric personal authentication technology using finger vain patterns has come into use, various input devices for vein patterns have been devised. Particularly, many techniques for downsizing the input device and being able to photograph finger vein patterns at the same place every time have been proposed.

In the authentication device using finger vein patterns, authentication is performed according to whether previously registered finger vein patterns and finger vein patterns photographed for the authentication match or not. Accordingly, it is desirable to enable finger vein patterns to be photographed under the same conditions by avoiding influences from ambience when the finger vein patterns are read. If two finger vein patterns to be compared with each other are different in position or angle, the photographed image is corrected by image processing and compared. If the difference is big, the image processing takes a long time and cannot promise appropriate responsibility.

The near-infrared radiation that is used in reading vein patterns affects most among ambience that affects the finger vein pattern to be photographed. The ambience, which is changed by the place of the sun and the like, changes contrast in the finger vein patterns the photographed by near-infrared radiation, resulting in inappropriately photographed finger vein patterns. For example, when too much outside light is coming in, the contrast in the finger vein patterns is lowered and authentication accuracy is also lowered. If the device is adapted to cover a living organism, which is to be photographed, to prevent the near-infrared radiation coming in the photographing unit as the outside light, the state of the living organism cannot be recognized. This gives rise to a problem in that the position of the patterns to be taken is apt to be changed, or such configuration terrifies or worries a user.

A technology to address the problem has also been examined and those described in JP-A-2003-30632, JP-A-2005-301552, and JP-A-2006-99493 have been produced. JP-A-2003-30632 and JP-A-2005-301552 disclose technologies to surround an object of authentication with shielding members to block the outside light such as ceiling lighting from going into an imaging space, or light sources are tilted like a roof with a gap at the top or use transparent shielding members to help a user to locate the finger by allowing the user to check the finger and to alleviate the user's uneasiness. JP-A-2006-99493 discloses a technology to arrange light sources at the sides leaving the top open to alleviate the user's uneasiness and help the user to locate the finger that is an object of authentication.

BRIEF SUMMARY OF THE INVENTION

Figure 1:
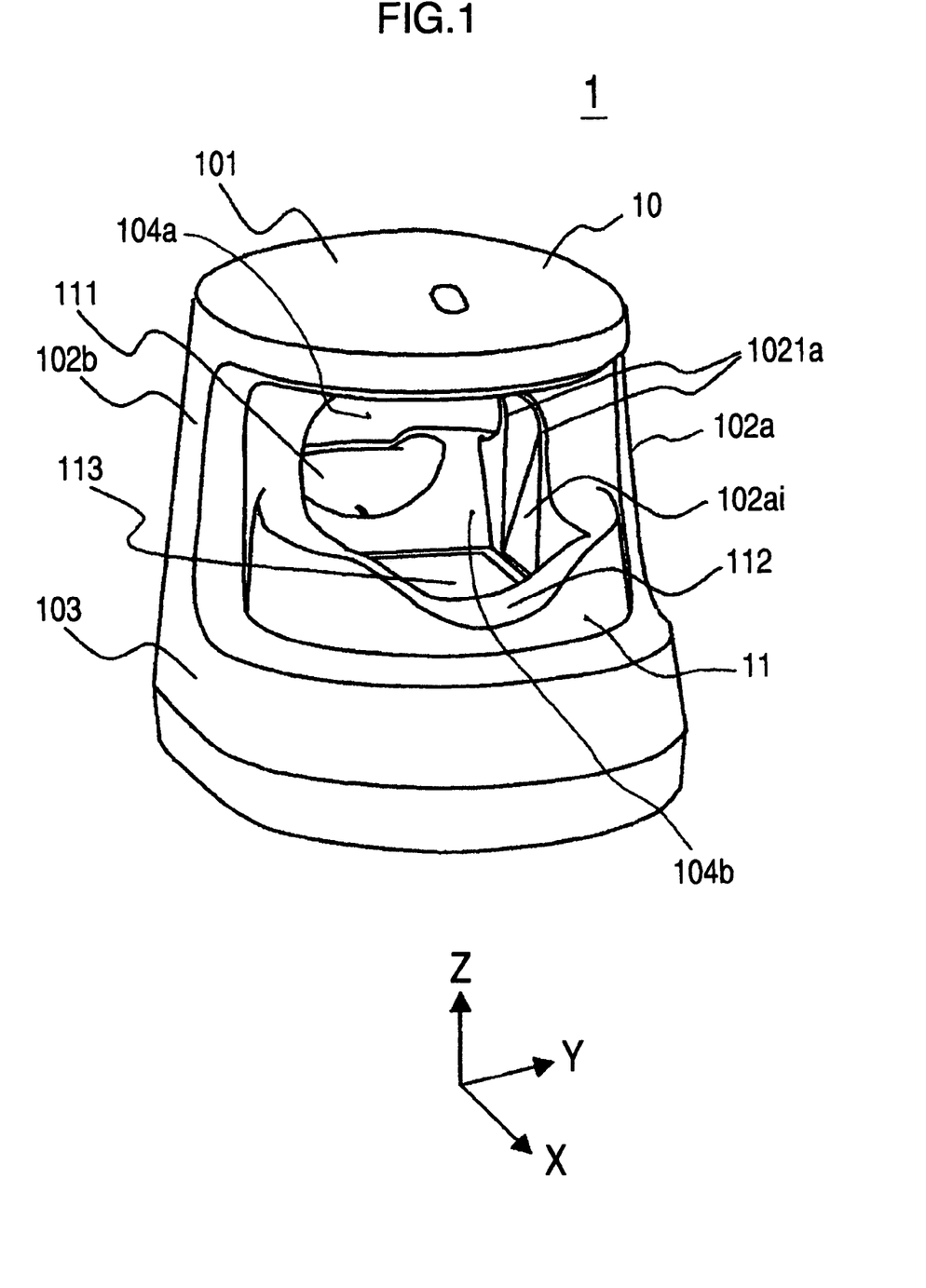
FIG. 1 is an outside oblique diagram of a finger vein pattern inputting device as a first embodiment of the present invention.
Figure 7:
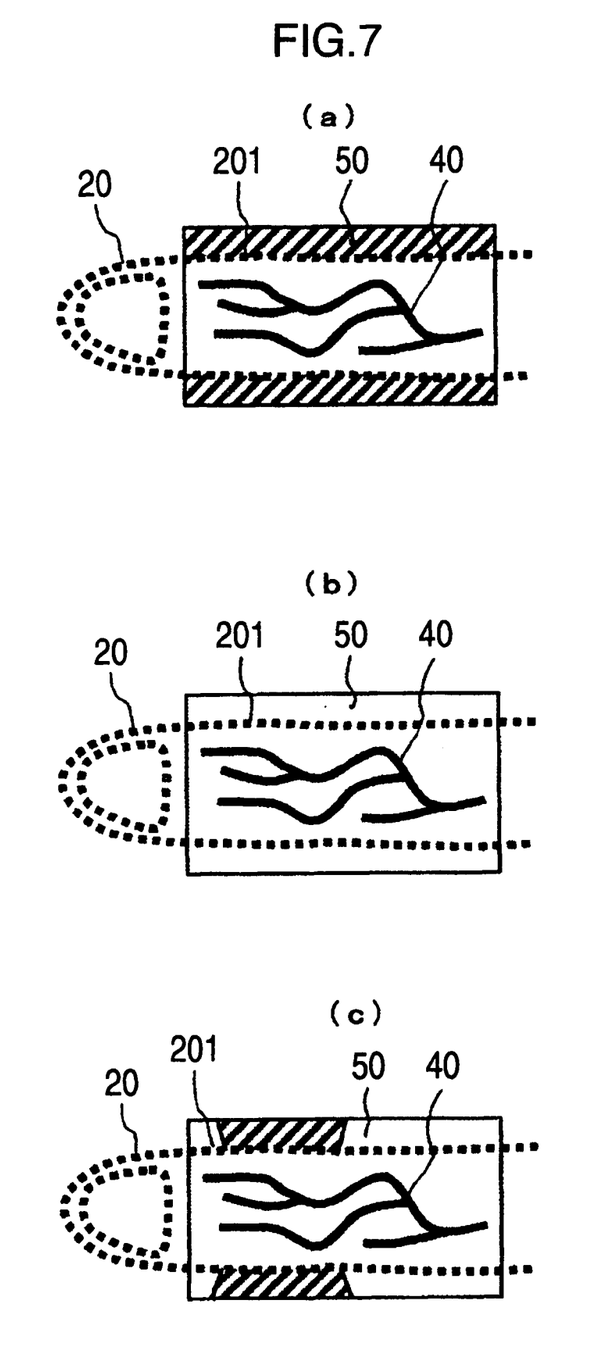
FIG. 7 is an illustration showing affection of the outside light on the finger vein pattern being imaged.

Among the abovementioned official gazettes, the technology described in JP-A-2003-30632, which is shown in FIG. 1, may have outside lights coming into an imaging space from the sides, and the authentication device shown in FIG. 7 may have the outside light such as in the case of the ceiling-area-lighting coming into an imaging space through a gap in a light source part arranged like a roof. A technology described in JP-A-2005-301552 requires a finger, the object of the authentication, to be inserted in a closed-type imaging space in a shielding member, which may make the persons to be authenticated feel uneasy or fear of confined spaces when they insert their finger. Further, it may be difficult for the finger table to be checked or cleaned. The technology described in JP-A-2006-99493 may be difficult of reducing the affection by the outside light on an image to be imaged.

In the view of the abovementioned conventional arts, a problem of the present invention is to enable an object of the authentication to locate his/her finger easily without feeling fear of confined spaces and uneasiness when he/she inserts his/her finger in a finger vein pattern inputting device for personal authentication and also to improve authentication accuracy by effectively blocking the outside light from coming in.

An object of the present invention is to provide a finger vein pattern inputting device with high authentication accuracy, which solves the abovementioned problems and has high operability.

In order to solve the abovementioned problems, in the present invention, a finger vein pattern inputting device for imaging a finger vein pattern of a finger, which is an object of the authentication, has a finger table for supporting a finger, which is an object of the authentication, in contact with the front part of the finger for locating the finger provided in a case, with the case basically adapted to be closed at parts corresponding to the top and bottom of the finger and parts corresponding to the left side and the right side of the finger and opened at parts corresponding to the front and the base of the finger, and also with an imaging range for imaging means such as an imaging element provided in the parts corresponding to the left side and the right side of the finger. Specifically, a finger vein pattern inputting device has the finger table with a first part for supporting and locating the finger to be authenticated by touching the front part of the finger, and a second part for passing a near-infrared ray, which transmitted the finger and formed a finger vein pattern, wherein the case has a hood part that is provided with a light emitting part and covers the upper side of the finger table, side parts that are partially provided lengthwise of a finger at both sides of the second part of the finger table, covers the side parts of the second part and supports the hood part, and forming an opening at the upper side of the first part of the finger table, and a bottom part provided with the finger table and the imaging means, and wherein an imaging space for a finger vein pattern of a finger to be authenticated is provided between the hood part, the side parts and the bottom part, and forms an outside part of the device, wherein an imaging range of the imaging means is formed in an inner region facing the side parts of the case.

According to the present invention, a finger vein pattern inputting device with high operability and high authentication accuracy can be provided.

Other objects, features and advantages of the invention will become apparent from the following description of the embodiments of the invention taken in conjunction with the accompanying drawings.

DETAILED DESCRIPTION OF THE INVENTION

Embodiments of the present invention will be described below with reference to the drawings.

Figure 2:
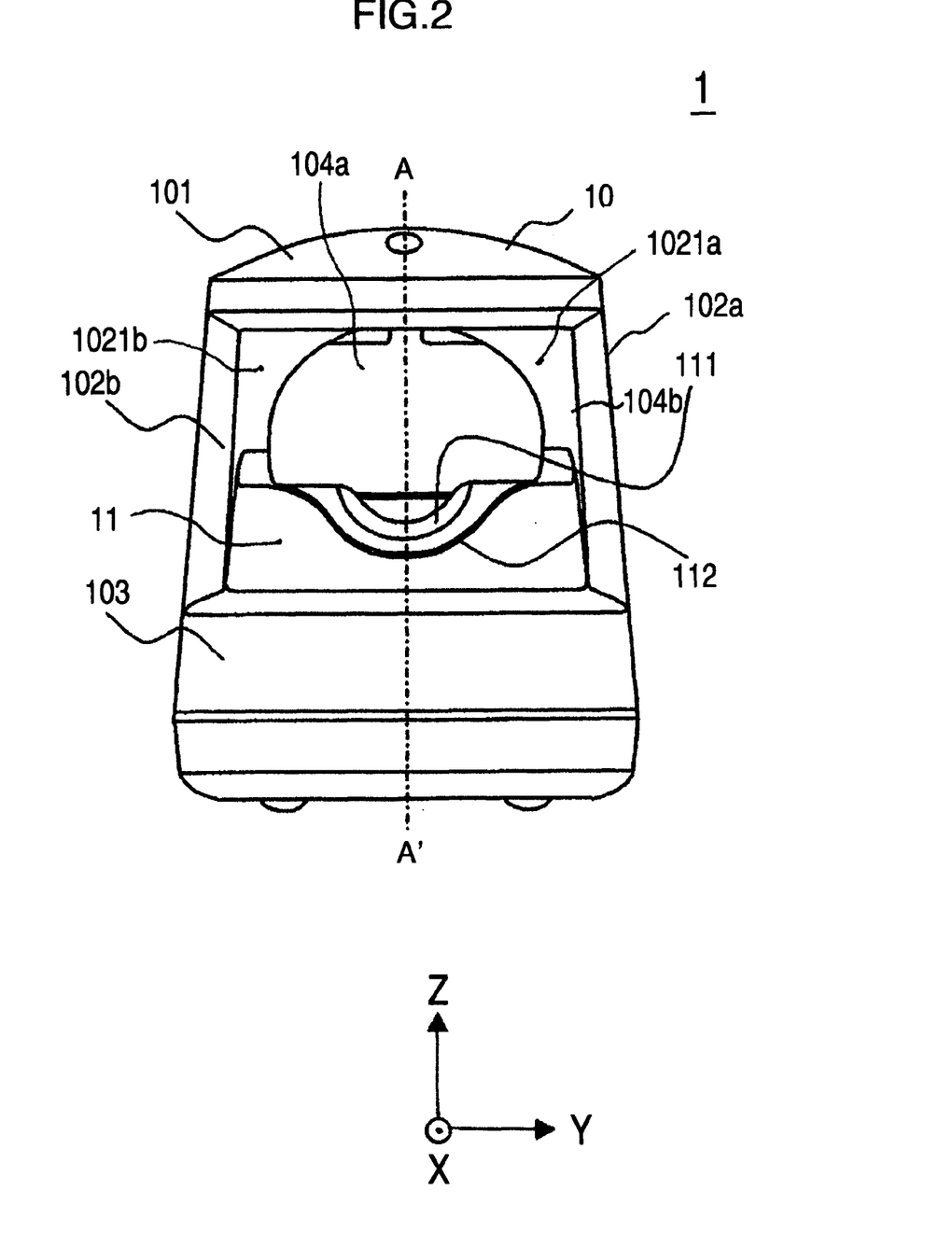
FIG. 2 is an outside front diagram of the finger vein pattern inputting device shown in FIG. 1.
Figure 3:
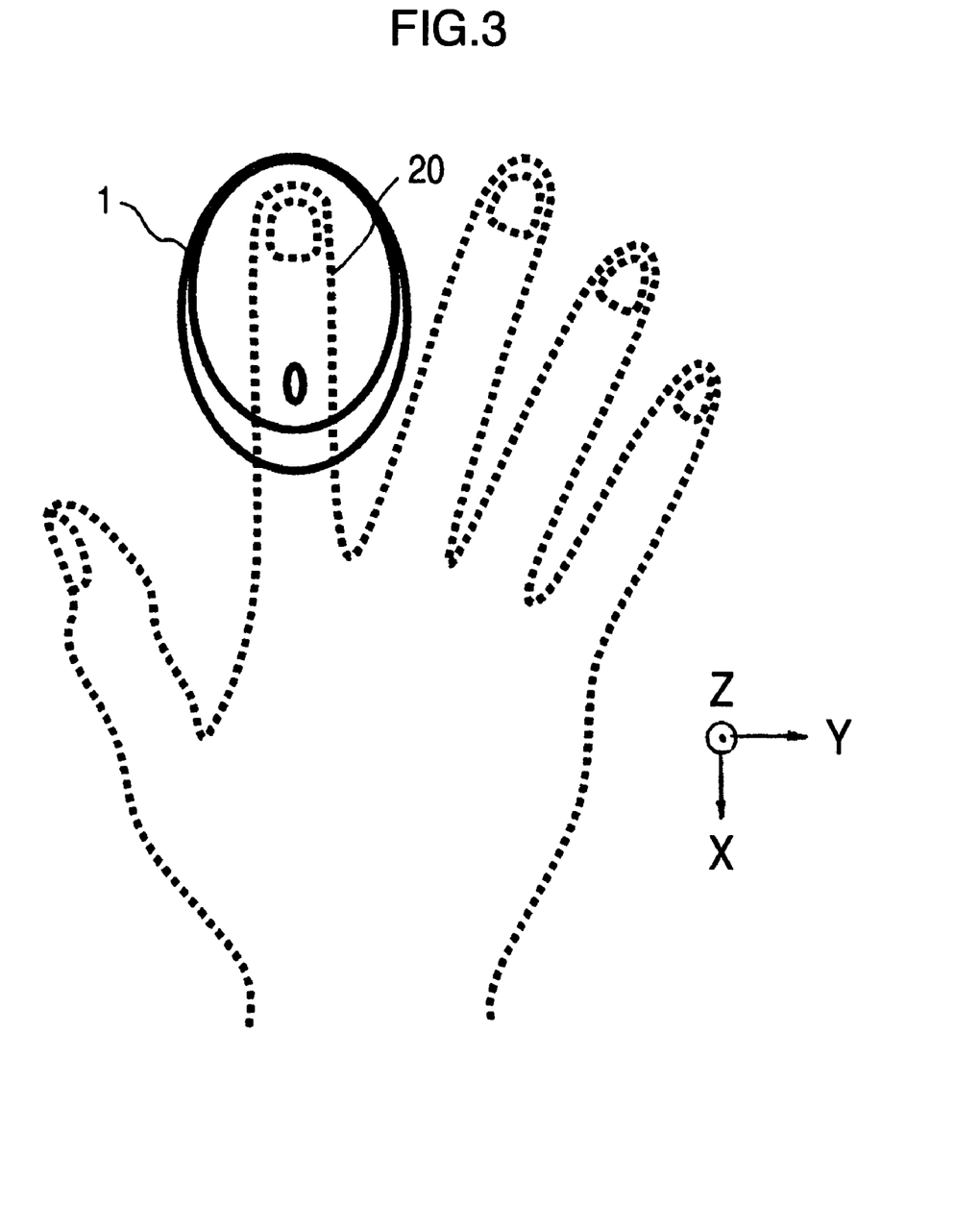
FIG. 3 is a diagram showing the finger vein pattern inputting device shown in FIG. 1 with a finger to be authenticated placed.
Figure 4:
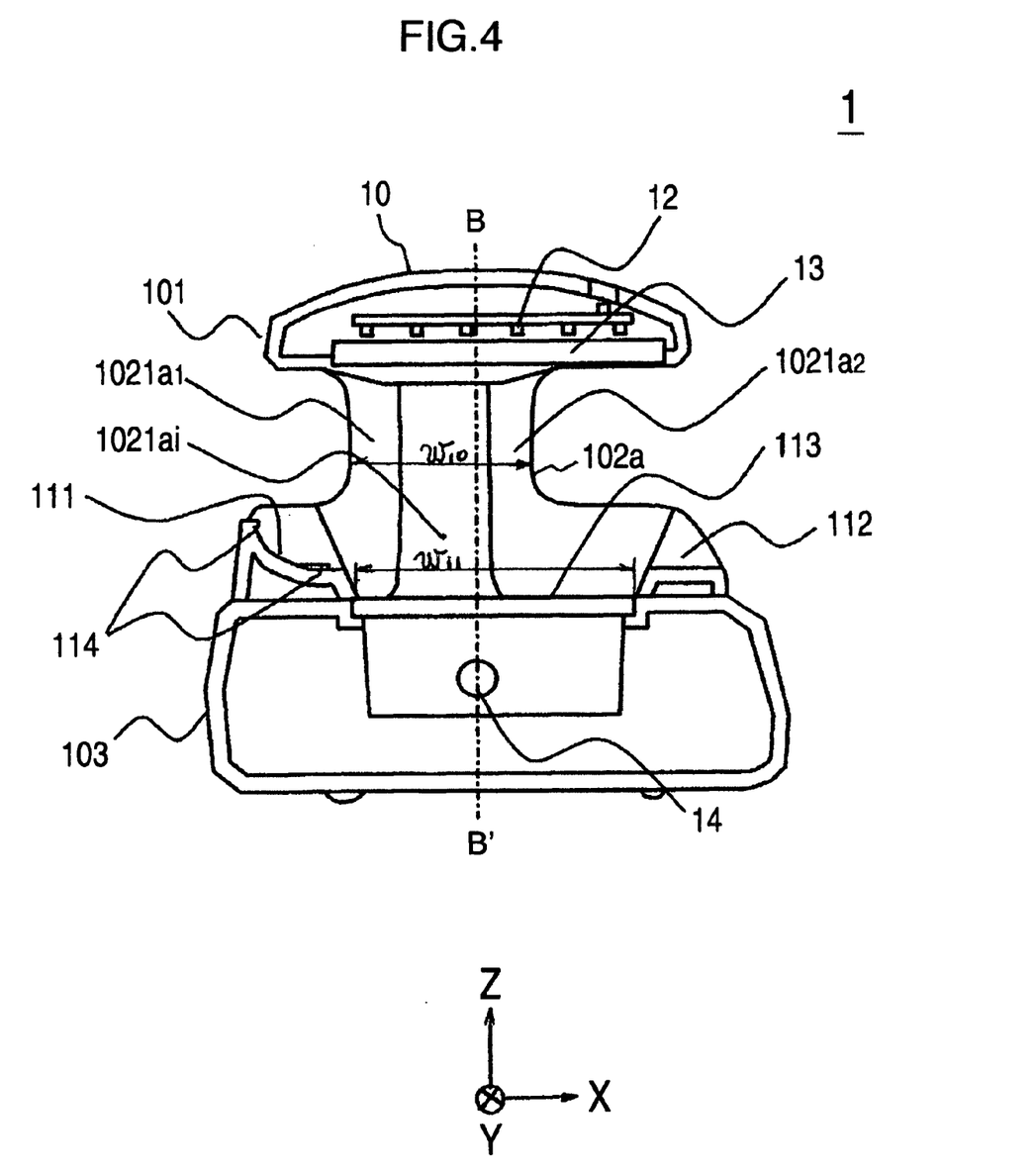
FIG. 4 is a diagram showing a A-A' cross-section in configuration shown in FIG. 2.
Figure 5:
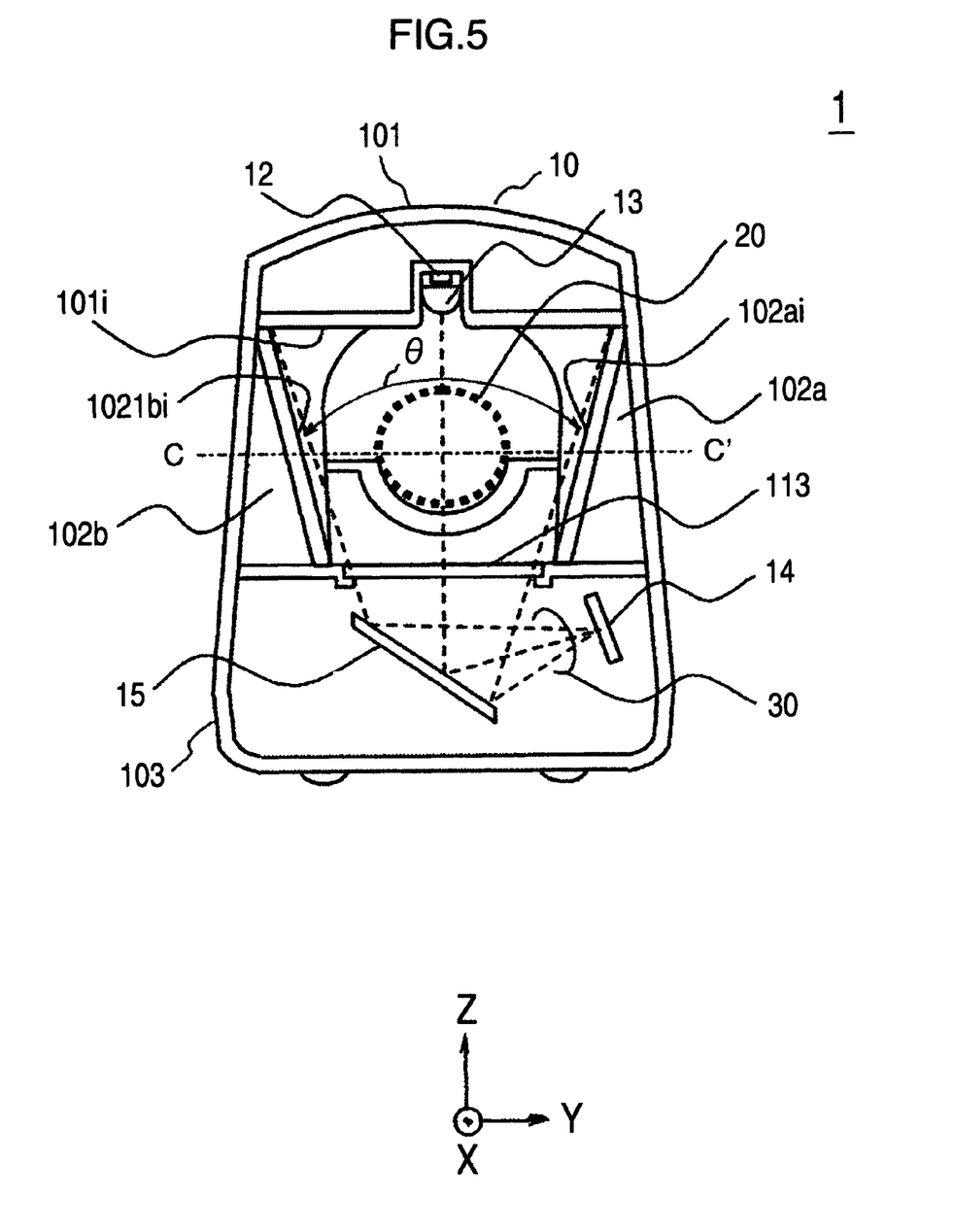
FIG. 5 is a diagram showing a B-B' cross-section in configuration shown in FIG. 4.
Figure 6:
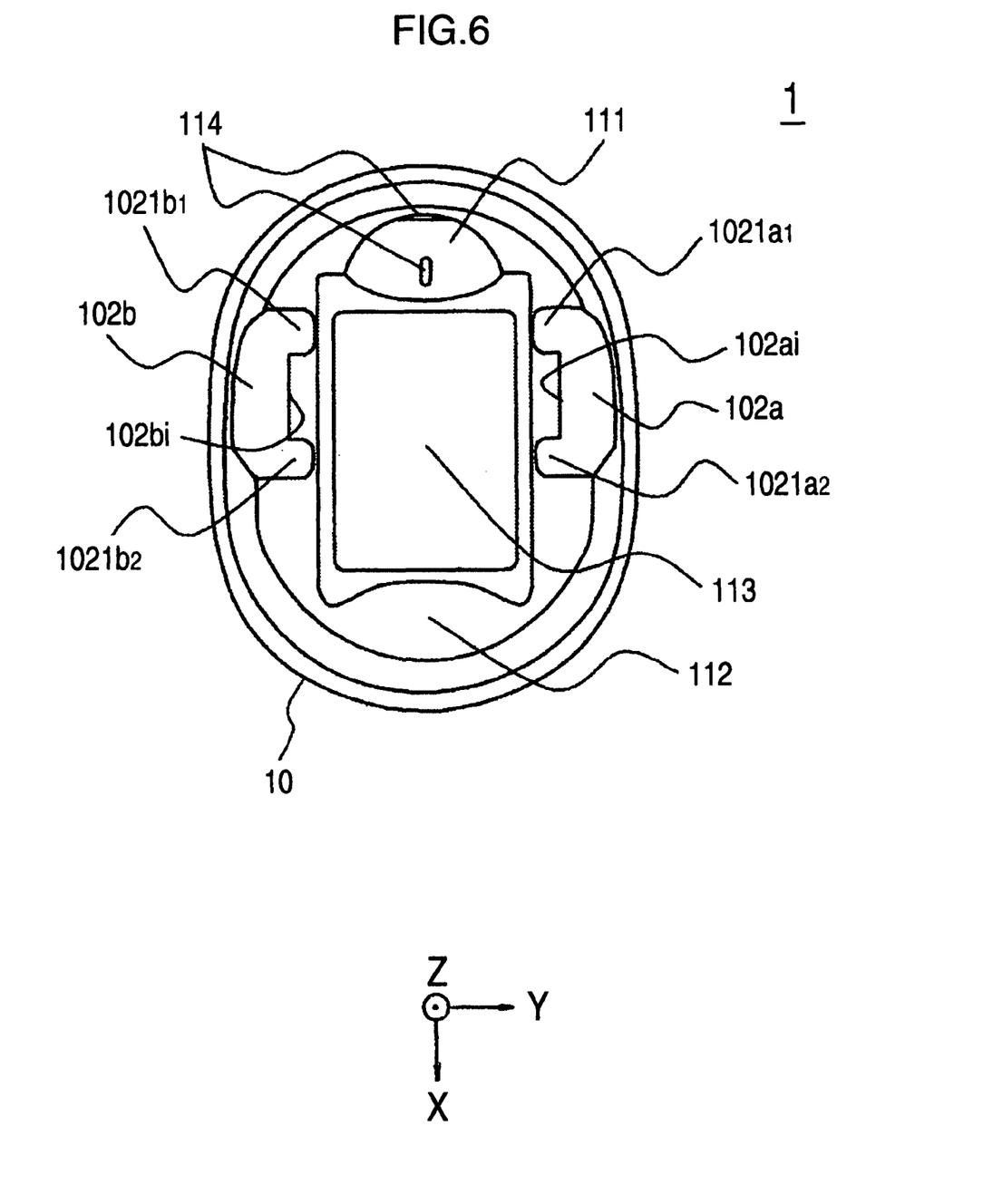
FIG. 6 is a diagram showing a C-C' cross-section in configuration shown in FIG. 5.
Figure 8:
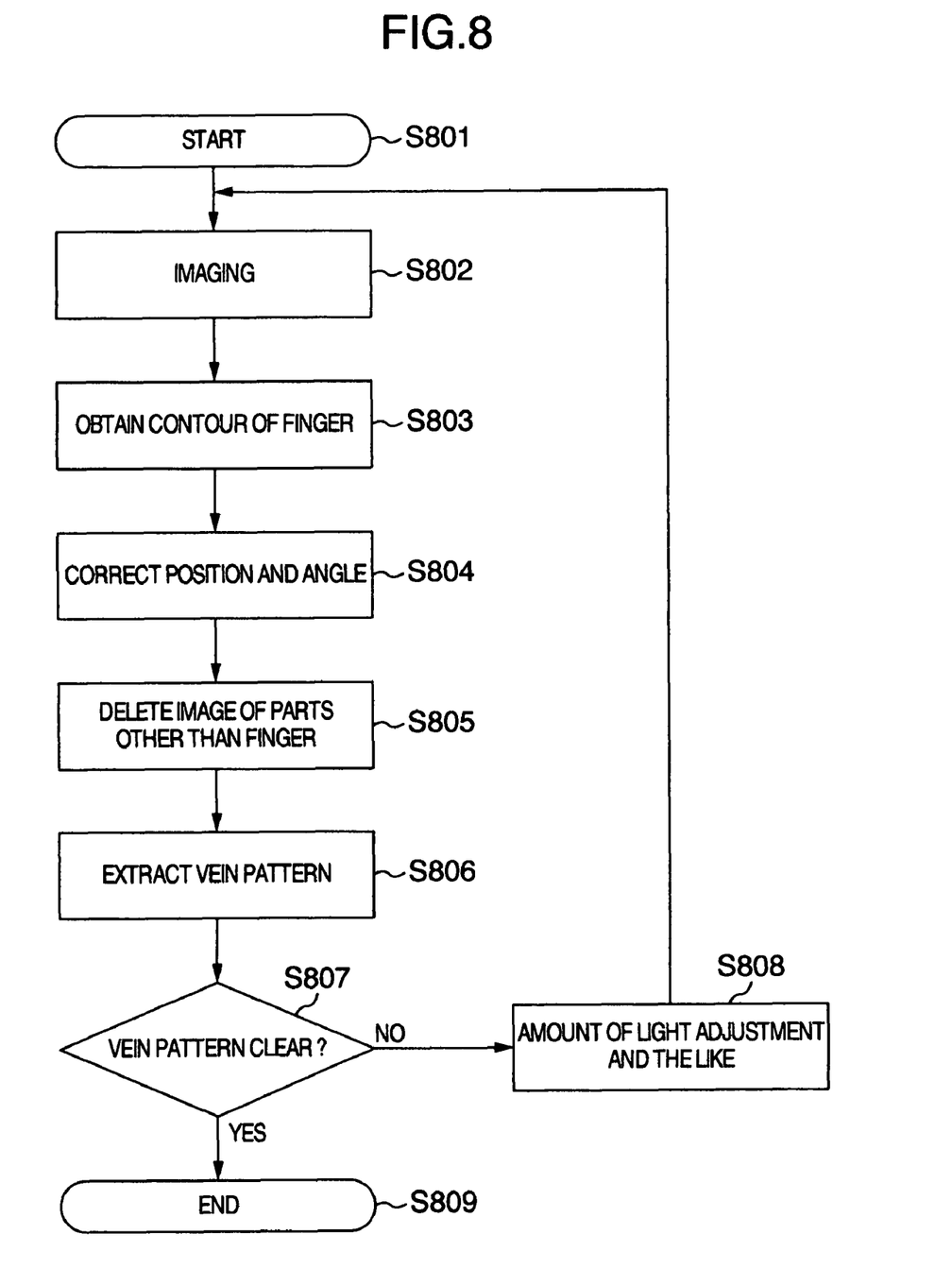
FIG. 8 is an operational flow diagram of the finger vein pattern inputting device shown in FIG. 1.
Figure 9:
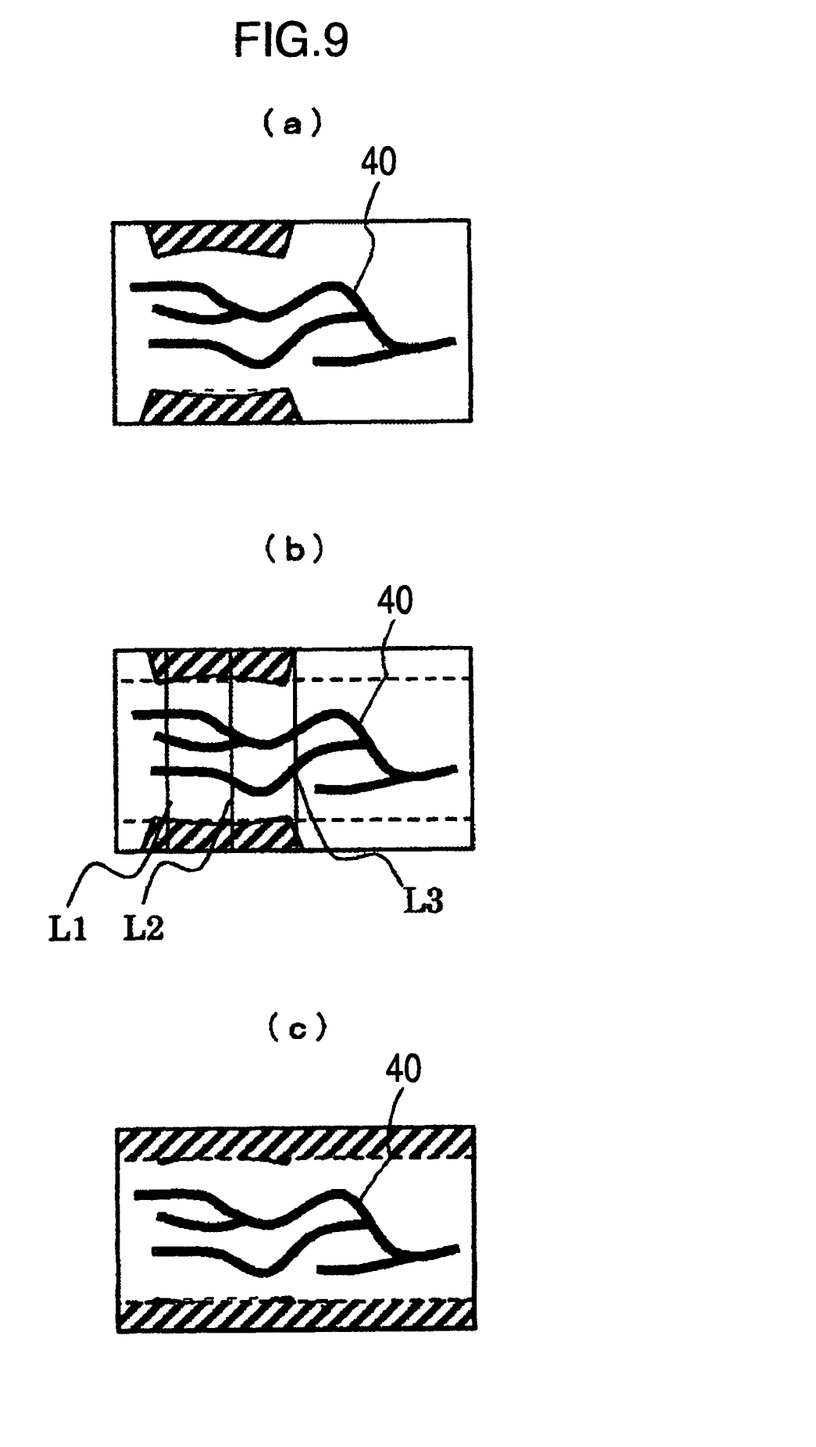
FIG. 9 is an illustration of image processing when imaging is performed by the finger vein pattern inputting device shown in FIG. 1.

FIG. 1 to FIG. 9 are illustrations of the finger vein pattern inputting device of the first embodiment of the present invention. FIG. 1 is an outside oblique diagram of the finger vein pattern inputting device as the first embodiment of the present invention. FIG. 2 is an outside front diagram of the finger vein pattern inputting device shown in FIG. 1. FIG. 3 is a diagram showing the finger vein pattern inputting device shown in FIG. 1 with a finger to be authenticated placed in. FIG. 4 is a diagram showing an A-A' cross-section in configuration shown in FIG. 2. FIG. 5 is a diagram showing a B-B' cross-section in configuration shown in FIG. 4. FIG. 6 is a diagram showing a C-C' cross-section in configuration shown in FIG. 5. FIG. 7 is an illustration showing affection of the outside light on the finger vein pattern being imaged. FIG. 8 is an operational flow diagram of the finger vein pattern inputting device shown in FIG. 1. FIG. 9 is an illustration of image processing when imaging is performed by the finger vein pattern inputting device shown in FIG. 1.

In FIG. 1, reference numeral 1 designates a finger vein pattern inputting device, 10 designates a case for forming outside of the finger vein pattern inputting device 1, 11 designates a finger table for supporting and locating a finger to be authenticated so as to place the finger at a predetermined statue at a predetermined place.

Reference numeral 111 designates a first part, which forms a part of the finger table 11, for supporting and locating the finger by touching the front part at the tip side from the top joint of the finger to be authenticated. Reference numeral 112 designates a same first part, which also forms a part of the finger table 11, being at a distance from the first part 111 for supporting and locating the finger by touching the front part at the base side of the finger from the first joint of the finger to be authenticated. Reference numeral 113 designates a glass surface as a second part, which also forms a part of the finger table 11 and is placed between the first parts 111 and 112 for passing a near-infrared radiation that transmitted the finger and formed a finger vein pattern.

Reference numeral 101 designates a hood part that forms a part of the case 10 and covers the upper side of the finger table 11. Each of reference numerals 102a and 102b is a side part that forms a part of the case 10, is partially provided in the lengthwise direction of the finger at either side of the second part 113 of the finger table 11, partly covers the side part of the second part 113 of the finger table 11, and supports the hood part 101.

Reference numeral 102ai designates an inside part of the side part 102a. Reference numeral 1021a designates a rib part extending in the direction toward the hood part 101 provided in the inside part 102ai of the side part 102a. Reference numeral 103 designates a bottom part, which is also a part of the case 10 with the finger table 11 provided.

The hood part 101 is provided with a light emitting part (not shown) that emits a near-infrared light to be radiated on the finger to be authenticated (not shown) placed on the finger table 11. The bottom part 103 is provided with imaging means (not shown) that images an image of the finger vein pattern that is formed by the near-infrared ray transmitted the finger to be authenticated from the backside part to the front part.

Each of 104a and 104b is an opening formed at the upper side (in the direction of Z) of the first parts 111 and 112 of the finger table 11, which are adjacent to the side parts 102a and 102b in the case 10.

The case 10 forms an imaging space between the hood part 101, the side parts 102a and 102b and the bottom part 103. The imaging space is a space for leading the near-infrared light from the light emitting part to the backside of the finger to be authenticated, transmitting the led near-infrared light through the finger to form an image of the finger vein pattern, forming a space for leading the near-infrared light that formed the image toward the imaging means side such as an imaging element and also forms an outside of the finger vein pattern inputting device.

In the imaging space, an imaging range of the imaging means, which is orthogonal to (in the direction of ±Y axis) lengthwise direction of the finger to be authenticated, is formed in a region between inside parts of both side parts 102a and 102b facing to each other of the case 10. That is, the side parts 102a and 102b of the case 10 have all the imaging ranges of the imaging means included in the range between inside parts of both side parts 102a and 102b facing to each other of the case 10.

In the configuration mentioned above, the finger to be authenticated is inserted in the direction of −X axis from the opening 104b into the finger vein pattern inputting device 1 with the front part of the finger downside (in the direction of −Z axis), and when the front part at the tip side from the first joint reaches a predetermined place of the first part 111 of the finger table 11, the inserting operation stops at the predetermined place, and finally the finger is located with the front part at the tip side touching the first part 111 in a still state.

Here, the finger is located with the front part at the base side of the finger from the first joint touching the first part 112 of the finger table 11 in a still state. In that state, the first joint from the finger and the adjacent parts (parts in the direction of ±X axis) of the first joint are placed on the top of the second part 113 of the finger table 11.

In such a state, the near-infrared light is radiated from the light emitting part provided on the upper hood part 101 to at least the region to be authenticated in the region formed by the first joint part of the finger and the adjacent parts thereof. Dispersed lights from the radiated near-infrared light are absorbed by hemoglobin in blood flowing through the vein of the finger while the near-infrared light is transmitting through the finger so that the finger vein is made as an image of dark pattern, i.e., an image of the finger vein pattern. The near-infrared light that formed an image of the finger vein pattern is incident on the imaging means such as an imaging element provided on the bottom part 103 of the case 10 through a predetermined light path and converted into electric signals corresponding to the image.

The side parts 102a and 102b block the outside light from coming into the region to be authenticated in the imaging space to which the near-infrared light is radiated by covering a part at the side part of the second part 113 of the finger table 11. The rib part reduces the outside light coming into the range to be authenticated from a horizontal direction such as in the direction of X axis, or blocks the outside light coming into the hood part 101 in the obliquely upward direction.

FIG. 2 is an outside front diagram of the finger vein pattern inputting device 1 shown in FIG. 1.

In FIG. 2, reference numeral 1021b designates the rib part that is provided in the inside part of the side part 102b and extends towards the hood part 101. The other reference numerals designate the same as those in FIG. 1. The farther the rib parts 1021a and 1021b are placed away from the finger table 11, the more the parts extrude in the direction of –Y axis and +Y axis. Such inner configuration of the side parts 102a and 102b can block the outside light from coming into the region to be authenticated in the horizontal direction such as in the direction of X axis and also block the outside light from coming into the hood part 101 in the obliquely upward direction more effectively.

As such, as the outside light is blocked from coming into the region to be authenticated or the hood part 101, the contrast between the contour of the finger and the surroundings when an image of the finger vein pattern is imaged can be improved. Accordingly, the contour of the finger can be easily and correctly extracted.

The components shown in FIG. 1 and FIG. 2 used in the description and the drawings will be designated by the same reference numerals as in FIG. 1 and FIG. 2.

FIG. 3 is a diagram showing the finger vein pattern inputting device 1 shown in FIG. 1 with a finger to be authenticated placed.

In FIG. 3, reference numeral 20 designates the finger to be authenticated. The figure to be authenticated 20 is inserted in the direction of –X axis from the opening 104a into the finger vein pattern inputting device 1 with the front part facing downward (in the direction of –Z axis), and located at the place when the finger is moved to a predetermined place.

FIG. 4 is a diagram showing an A-A' cross-section in configuration shown in FIG. 2.

In FIG. 4, each of reference numerals $1021a_1$ and $1021a_2$ designates a rib part (the same as the rib part 1021a) provided in the inside part $102a_1$ of the side part 102a with $1021a_1$ designating a rib part close to the first part 111 of the finger table 11 of the rib part 1021a and $1021a_2$ designating a rib part close to the first part 112 of the finger table 11 of the rib part 1021a. The rib parts $1021a_1$ and $1021a_2$ are adapted to extending toward the hood part 101 of the case 10, respectively.

The side part 102a of the case 10 is adapted to have a width $w_{10}$ of the finger to be authenticated in the lengthwise direction (in the direction of ±X axis) less than the dimension $w_{11}$ of the imaging range at the place of the second part 113 of the finger table 11 in the imaging element 14 in that direction. That is the same as in the side part 102b of the case 10.

Reference numeral 12 designates an LED as a light emitting part, reference numeral 13 designates a lens for gathering light, reference numeral 14 designates an imaging element as imaging means, and reference numeral 114 designates a protrusion that is provided in the first part 111 of the finger table 11 for locating the finger to be authenticated. The other reference numerals designate the same as those shown in FIG. 1 and FIG. 2. The LEDs 12 are arranged in the lengthwise direction of the finger to be authenticated (in the direction of ±X axis).

Both of the first parts 111 and 112 of the finger table 11 have concave surfaces on which the front part of the finger touches. Two protrusions for location 114 are provided on the concave surfaces of the first part 111 of the finger table 11 in the lengthwise direction of the finger (in the direction of ±X axis). The person to be authenticated stops the inserting operation of the finger at the place where the tip side from the first joint of the finger touches the two protrusions 114, and locates the finger against the finger table 11.

FIG. 5 is a diagram showing a B-B' cross-section in configuration shown in FIG. 4.

In FIG. 5, reference numeral 101i designates the inside part of the hood part 101 at the imaging space side, reference numeral 15 designates a mirror that reflects the near-infrared light that transmitted through the finger to be authenticated 20 and formed an image of the finger vein pattern, and reference numeral 30 designates an imaging range of the imaging element 14. The other reference numerals designate the same as those in FIG. 1, FIG. 2 and FIG. 4.

The side parts 102a and 102b of the case 10 have the inside parts 102ai and 102bi tilting at almost the same angle as the angle of view θ of the imaging range of the imaging element 14 and placed at the outside the imaging range. That is, the side parts 102a and 102b are adapted to have all the imaging range of the imaging element 14 included in the range between the inside parts 102ai and 102bi facing the side parts 102a and 102b respectively. That configuration reflects the outside light or the near-infrared light that is reflected at the surface of the finger at the side parts 102a and 102b to block the lights from being incident on the imaging element 14.

FIG. 6 is a diagram showing a C-C' cross-section in configuration shown in FIG. 5.

In FIG. 6, each of reference numerals $1021b_1$, $1021b_2$ designates rib parts provided in the inside part $102b_1$ of the side part 102b with $1021b_1$ designating a rib part close to the first part 111 of the finger table 11 and $1021b_2$ designating a rib part close to the first part 112 of the finger table 11. The other reference numerals designate the same as those in FIG. 1, FIG. 2, FIG. 4 and FIG. 5.

The rib parts $1021b_1$ and $1021b_2$ are adapted to extend toward the hood part 101 of the case 10, respectively. The side parts 102a and 102b of the case 10 are provided at the place close to the tip side of the finger in the lengthwise direction of the finger to be authenticated (in the direction of ±X axis). The side parts 102a and 102b are provided at the places corresponding to the first joint and the adjacent parts of the first joint at the side parts of the second part 113 of the finger table 11.

On the finger table 11, the first part 111 supports the finger to be authenticated by touching the front part at the tip side from the first joint, the first part 112 supports the finger by touching the front part at the base side of the finger from the first joint, and the glass surface 113, which is the second part, is provided between the two first parts 111 and 112. The height of the glass surface 113 in the direction of Z axis is lower than the height of the surfaces of the first parts 111 and 112 touching the finger in the direction of Z axis, respectively. That is for the purpose of enabling the device to form a clear image of a finger vein pattern, by avoiding a place of the finger to be authenticated supported by the two first parts 111 and 112 on the finger table 11, i.e., the first joint and the front part of the first joint through which the near-infrared light transmits being pressed by the glass surface 113.

FIG. 7 is an illustration showing affection of the outside light on the finger vein pattern being imaged.

In FIG. 7, each of (a) to (c) shows an image example of the finger vein pattern obtained when the near-infrared light transmits through the finger to be authenticated. As the hemoglobin in blood flowing through the veins absorbs the dispersed lights of the near-infrared light, the outgoing radiation transmitted through the finger forms an image of only the vein parts appearing as dark patterns, i.e., an image of the finger vein pattern 40. The diagram (a) is an image example without the outside light in which the outside 50 of the contour 201 of the finger 20 appears dark as no near-infrared light is applied.

The diagram (b) is an image example with a strong outside light without anything to cover the finger 20. In such a case, as the near-infrared light included in the outside light also comes in the imaging range, the contour 201 of the finger 20 appears unclear.

The diagram (c) is an image example with a strong outside light when the finger vein pattern inputting device 1 described in FIG. 1 to FIG. 6 is used. In the finger vein pattern inputting device 1, the side parts 102a and 102b of the case 10 block the outside light and the inside part of the imaging space 101i of the hood part 101 is photographed. Thus, the parts with the side parts 102a and 102b are photographed dark and the parts without the side parts 102a and 102b are photographed bright with the outside light. Although details will be described later, the finger vein pattern inputting device 1 performs processing to extract the contour 201 of the finger 20 from the parts photographed dark and remove the image other than the finger 20 as a noise based on the information on the contour 201. Accordingly, the vein pattern of the finger 20 without being affected by the outside light can be extracted. The information on the contour 201 of the finger 20 can also be used for detecting shift of finger 20.

Each of FIG. 8 and FIG. 9 is an operational schematic diagram of the finger vein pattern inputting device 1 shown in FIG. 1. FIG. 8 is an operational flow diagram of the finger vein pattern inputting device 1 shown in FIG. 1. FIG. 9 is an illustration of image processing when imaging is performed by the finger vein pattern inputting device 1. The operation of the finger vein pattern inputting device 1 is performed while an optical system in the device is electrically connected with controlling means (not shown). The controlling means includes a microcomputer or a personal computer, for example. When the controlling means is formed by a microcomputer or the like, the controlling means may be built in the finger vein pattern inputting device 1. When the controlling means is formed by a personal computer or the like, it may be connected to the finger vein pattern inputting device 1 as an outboard device. FIG. 8 and FIG. 9 will be described below by assuming that the controlling means is built in the finger vein pattern inputting device 1.

In FIG. 8, (1) In the authentication, a signal for commanding finger vein pattern photographing is input into the finger vein pattern inputting device 1 and the finger vein pattern inputting device 1 starts processing of finger vein pattern photographing based on the input (step S801).

(2) The finger vein pattern inputting device 1 photographs an image including the finger vein pattern image formed by the near-infrared light radiation and transmittion with the imaging element 14 (step S802). An example of an image obtained by the photographing is shown in FIG. 9 (a). In FIG. 9(a), reference numeral 40 designates the finger vein pattern. The hutching part (dark part) indicates parts to which the near-infrared light of the outside light is shielded by the side parts 102a and 102b of the case 10.

(3) The controlling means performs extracting processing of the contour of the finger by using an image part formed by the side parts 102a and 102b of the case 10 (step S803). The extracting method is shown in FIG. 9(b). First, on the three straight lines L1, L2 and L3 set to pass through dark parts of the side parts 102a and 102b across the image of the finger, the first point on which the contrast of dark and bright significantly changes is obtained from the end of the dark part of the side parts 102a and 102b to the center of the finger. Next, an approximated straight line is obtained by performing the least-square method on each of the obtained three points on the right side and the obtained three points of the left side of the finger and made as the contour of the finger.

(4) The controlling means compares the previously registered contour of the finger and the contour of the finger extracted from the photographed image, and if a shift in the position or angle of the extracted contour of the finger is found, correct the photographed image by moving or rotating the image (step S804). As such, by correcting the photographed image, the controlling means can significantly reduce the amount of processing information or processing time in matching or determining the finger vein patterns performed later.

(5) The controlling means removes the image other than the finger from the corrected image as required by filing the image other than the finger with black by considering the image other than the finger as a noise based on the contour of the finger extracted at step S803 (step S805). Specifically, as the side parts 102a and 102b of the case 10 are shorter than the length of the finger 20, the region surrounded by the straight lines L1 and L3 and the contour of the finger is a rectangular region. Thus, the controlling means makes the rectangular region enlarged in the direction of the finger as a finger region and removes the image of the other parts. An example of the result of the processing is shown in FIG. 9 (c).

As affection by the strength of the outside light appears in the image of the parts other than the finger, the processing at step S805 can remove almost all of the affection by the outside light. What remains as affection by the outside light is the affection by the part corresponding to a difference in extracting the contour of the finger at step S803. That seldom lowers the authentication accuracy. If the affection by the outside light corresponding to the difference needs to be further decreased, the part may be filled with color by making a slightly inside part from the contour of the finger extracted at step S803 as the boundary. With the processing at step S805, the processing without being affected by the outside light can be realized in the extracting processing and the amount of light adjusting processing performed on the vein pattern later.

(6) The controlling means performs imaging processing on the photographed image to perform the extracting processing of the finger vein pattern (step S806).

(7) The controlling means determines whether the finger vein pattern extracted at step S806 has clearness appropriate for determining whether it matches the previously registered pattern or not by matching the extracted finger vein pattern with the previously registered pattern (step S807)

(8) If the pattern lacks clearness as a result of determination at step S807, the controlling means performs adjustment on the amount of outgoing light from the LED 12, which is a light-emitting part (step S808), and the operation returns to step S802. It may be adapted to make the authentication by the finger vein pattern fails, if an image with appropriate clearness is not obtained even if the processing is repeated five to six times, for example.

(9) If the pattern is at the appropriate level without lacking clearness as a result of determination at step S807, the controlling means returns the photographed finger vein pattern (step S809).

According to the abovementioned first embodiment, as the openings 104a and 104b are provided adjacent to the side parts 102a and 102b of the case 10, the finger to be authenticated is placed on the finger table 11 in an open state in the finger vein pattern inputting device 1 with almost nowhere covered. Accordingly, the authentication can be performed with high visibility and with the finger located in an easy and highly accurate manner. Further, it does not cause the user to feel uneasiness.

As the contour of the finger can be easily determined with a dark part produced when the outside light is shielded by the side parts 102a and 102b of the case 10, the affection by the outside light can be effectively removed even if the openings 104a and 104b are there. The affection by the outside light can further reduced by the rib parts $1021a_1$, $1021a_2$, $1021b_1$, $1021b_2$ provided for the side parts 102a and 102b. As the side parts 102a and 102b is configured to include all the imaging ranges of the imaging element 14 in the region between the inside parts 102ai and 102bi that face the side parts 102a and 102b, side parts 102a and 102b are not photographed in the image to be photographed. That can reduce disturbance in the image and increase an effective image region for authentication. As a result, the finger vein pattern inputting device 1 of the first embodiment can realize high operability and high authentication accuracy.

Figure 10:
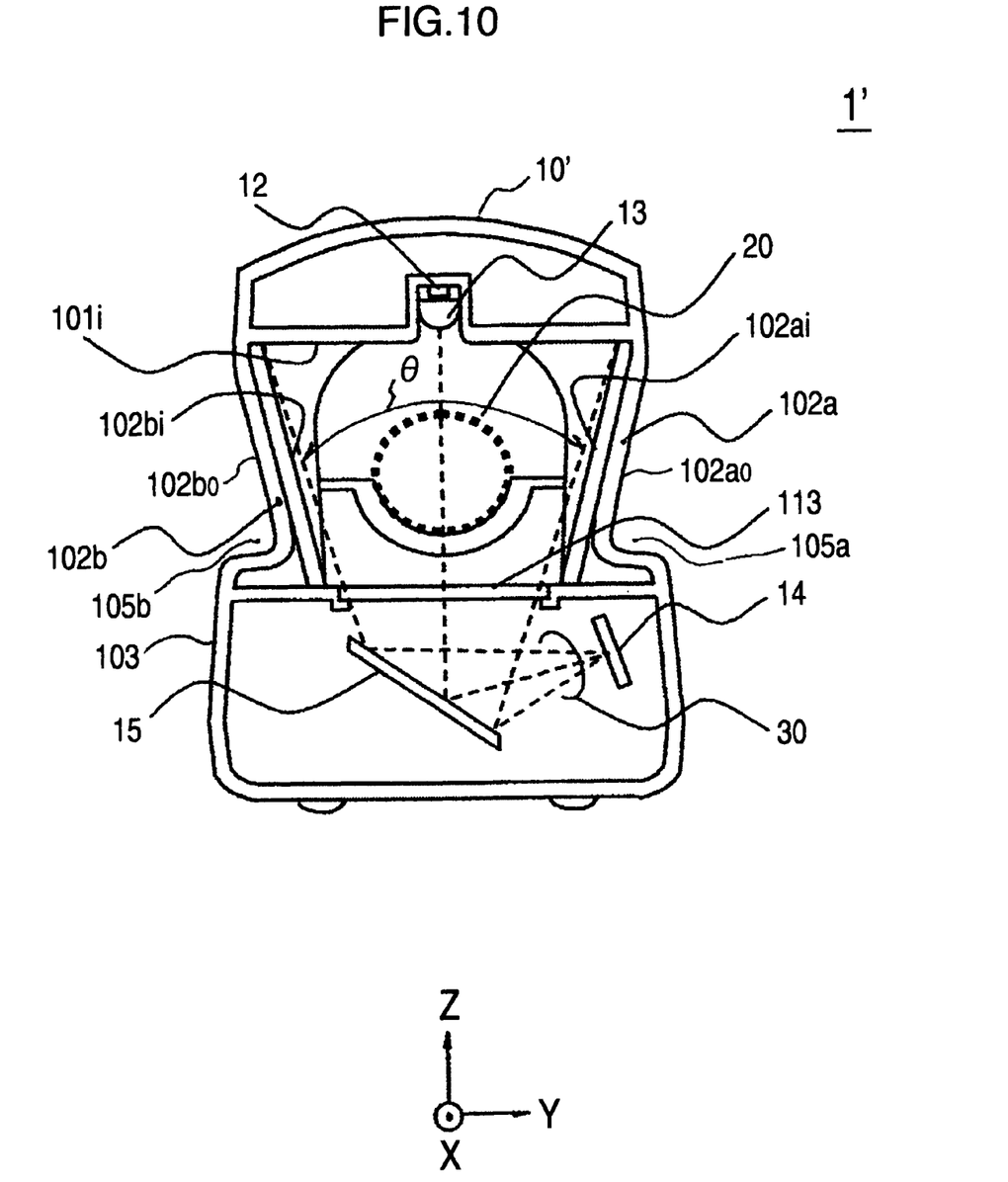
FIG. 10 is a configuration diagram of the finger vein pattern inputting device as a second embodiment of the present invention.

FIG. 10 is a configuration diagram of the finger vein pattern inputting device as a second embodiment of the present invention.

In FIG. 10, reference numeral 1' designates a finger vein pattern inputting device, 10' designates a case, and 102ao and 102bo respectively designate outside of the side parts 102a and 102b of the case 10'. The other reference numerals designate the same as those described in the case of the finger vein pattern inputting device 1 of the first embodiment shown in FIG. 5.

The finger vein pattern inputting device 1' as the second embodiment is adapted to have the inside parts 102ai and 102bi and the outside face 102ao and 102bo of the side parts 102a and 102b of the case 10' tilting at about the same angle as the angle of view θ of the imaging range of the imaging element 14 and placed outside the imaging range. The other configuration is the same as that described in the case of the finger vein pattern inputting device 1 of the first embodiment.

As the outside parts 102ao and 102bo are tilted with the inside parts 102ai and 102bi in the side parts 102a and 102b of the case 10', concave parts 105a and 105b are formed near the bottom part 103 of the case 10, at the outside of the outside parts 102ao and 102bo. That reduces the distance between the first part 112 of the finger table 11 and the outside part 102ao, and the distance between the first part 112 and the outside part 102bo.

The second embodiment can also provide the same effect as in the case of the first embodiment. Specifically, in the second embodiment, as the outside parts 102ao and 102bo of the side parts 102a and 102b of the case 10' are close to the first part 112 of the finger table 11, the person to be authenticated can place his/her finger to the authenticated on the finger table 11 without spreading his/her fingers and place the other adjacent fingers on the concave parts 105a and 105b. Even if the person to be authenticated has short fingers, the person need not spread his/her fingers and relieves his/her fingers from the pressure. That also lessens the dimension of the device.

Figure 11:
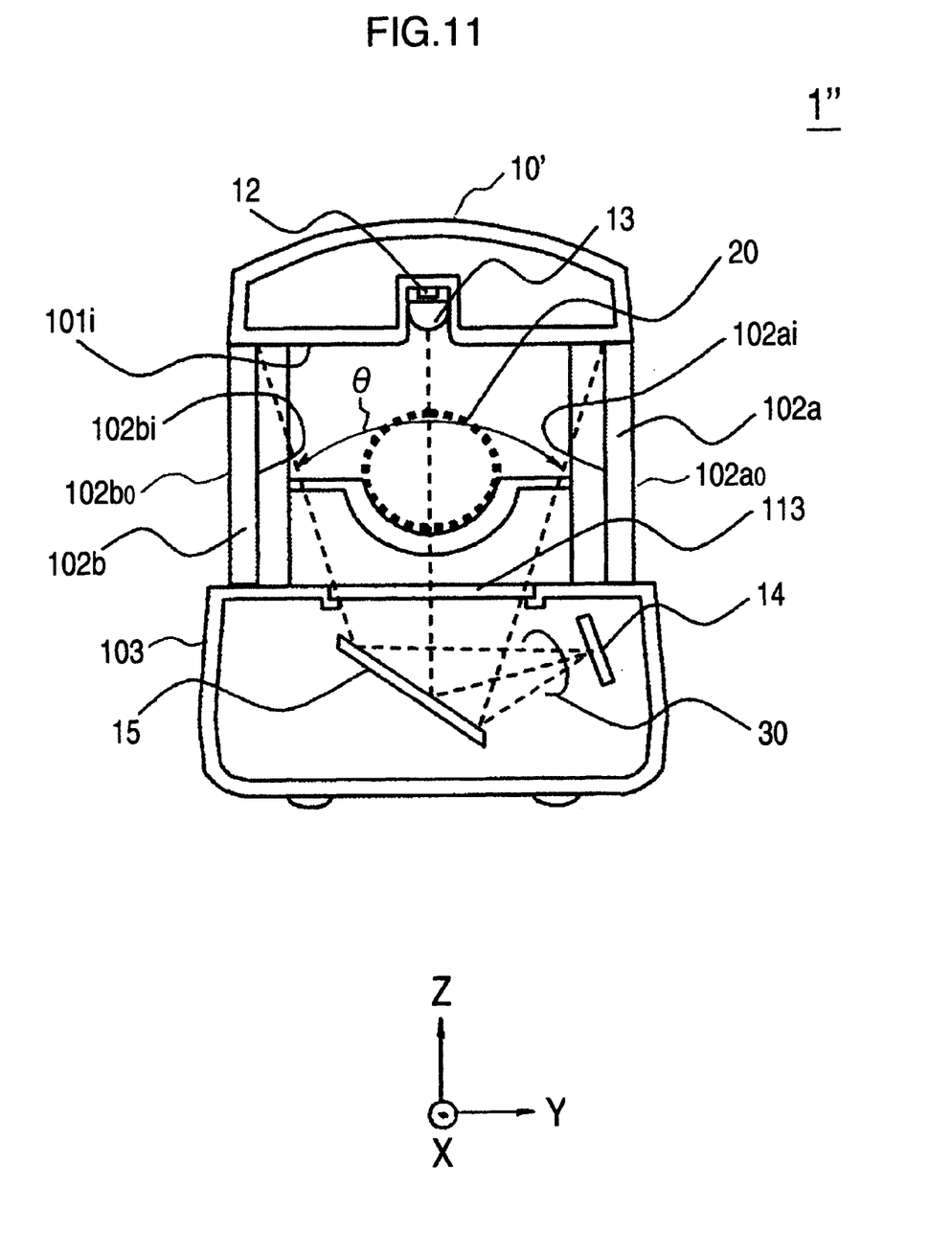
FIG. 11 is a configuration diagram of the finger vein pattern inputting device as a third embodiment of the present invention.

FIG. 11 is a configuration diagram of the finger vein pattern inputting device as a third example of the present invention.

In FIG. 11, reference numeral 1" designates a finger vein pattern inputting device, 10" designates a case. The other reference numerals are the same as those described in the case of the finger vein pattern inputting device 1 of the first embodiment shown in FIG. 5. The finger vein pattern inputting device 1" as the third embodiment is not adapted to have the inside parts 102ai and 102bi and the outside face 102ao and 102bo of the side parts 102a and 102b of the case 10" tilting as in the finger vein pattern inputting device 1' of the second embodiment, and adapted to have the inside parts and the outside parts standing straight in parallel in the direction of Z axis and placed outside the imaging range of the imaging element 14. The other configuration is the same as that in the finger vein pattern inputting device of the first embodiment.

The third embodiment can also provide the same effect as the first embodiment does.

In each of the abovementioned embodiments, the finger table 11 may be integrated with each of the cases 10, 10' and 10" or may be independent of each of them. The hood part 101, the side parts 102a and 102b and the bottom part 103 of each of the cases 10, 10' and 10" may be integrated with each other or a part or all of them may be independent of each other.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A finger vein pattern inputting device for inputting a finger vein pattern as biometric information for personal authentication comprising:
   a finger table with a first part for supporting and locating a finger to be authenticated by touching a front part of the finger, and a second part for passing a near-infrared light to be radiated on the finger to form a finger vein pattern;
   a light-emitting part for emitting the near-infrared light to be radiated on the finger to be authenticated;
   an imaging device for photographing an image of the finger vein pattern; and
   a case comprising:
   a hood part provided with the light-emitting part and covering an upper part of the finger table;
   two side parts partially provided at each side of the second part of the finger table in the lengthwise direction of the finger, for forming an opening at the upper part of the first part of the finger table at each of a tip side part and a root side part of the finger, when the finger is placed on the finger table so that the side parts are arranged between the openings in the lengthwise direction,
   wherein the case covers the side parts of the second part and supports the hood part; and
   a bottom part provided with the finger table and the imaging device,
   wherein the case forms an imaging space between the hood part, the side parts, and the bottom part, and the hood part, side parts and bottom part form an outside part of the inputting device and a closed condition;
   wherein an imaging range of the imaging device is formed in a region between an inside of each of the side parts of the case facing each other, and
   wherein the opening at the tip side part of the finger is arranged such that the tip side part of the finger is visible from an outside of the case in each of: (1) a finger width direction perpendicular to each of the lengthwise direction of the finger and an optical direction of the near-infrared light, and (2) a direction from the tip side part of the finger toward the root side part of the finger in parallel with the lengthwise direction of the finger.

2. The finger vein pattern inputting device according to claim 1, wherein
each of the side parts of the case have a width in the lengthwise direction of the finger that is less than a dimension of the imaging range of the imaging device at the second part of the finger table in the lengthwise direction.

3. The finger vein pattern inputting device according to claim 1, wherein
each of the side parts of the case have a rib part extending toward the hood part inside.

4. The finger vein pattern inputting device according to claim 1, wherein each of the side parts of the case have an inside part or the inside part and an outside part tilting at about the same angle as an angle of view of the imaging range.

5. The finger vein pattern inputting device according to claim 1, wherein each of the side parts of the case are provided near the tip side of the finger in the lengthwise direction of the finger.

6. The finger vein pattern inputting device according to claim 1, wherein the case has the side parts provided at the place corresponding to the first joint of the finger and adjacent parts of the first joint of the finger at the side parts of the second part of the finger table.

7. The finger vein pattern inputting device according to claim 1, wherein the finger table has the first part supporting the finger by touching the front part at the tip side from the first joint and the front part at the root side from the first joint and the second part provided between the two supporting parts of the first part.

8. The finger vein pattern inputting device according to claim 1, wherein the light emitting part includes an LED arranged in the lengthwise direction of the finger.

9. A finger vein pattern inputting device for inputting a finger vein pattern as biometric information for personal authentication comprising:
a finger table for mounting a finger to be authenticated;
a light-emitting part for emitting near-infrared light to be radiated on the finger;
an imaging device placed at a lower part of the finger table for photographing an image of the finger vein pattern formed by a near-infrared light that irradiates the;
a hood part provided with the light-emitting part that covers an upper part of the finger table; and
a case pole part that supports the hood part and forms an imaging space of the imaging device by the hood part and the finger table;
wherein the hood part, case pole part and finger table form a closed condition, and the case pole part extends to form an opening at each of a tip side part and a root side part of the finger,
wherein the inside part of the case pole part is placed outside an imaging angle of view of the imaging device and has surfaces opposed to each other to form therebetween a horizontal width increasing vertically upward, and
wherein the opening at the tip side part of the finger is arranged such that the tip side part of the finger is visible from an outside of the finger vein pattern inputting device in each of: (1) a finger width direction perpendicular to each of the lengthwise direction of the finger and an optical direction of the near-infrared light, and (2) a direction from the tip side part of the finger toward the root side part of the finger in parallel with the lengthwise direction of the finger.

10. The finger vein pattern inputting device according to claim 9, wherein:
the light-emitting part emits a near-infrared light along the finger, and
the imaging region of the imaging device has a range which is shielded against the outside light by the case pole part, and a range which is not shielded against the outside light by the case pole part.

11. The finger vein pattern inputting device according to claim 10, wherein:
the imaging region which is shielded against the outside light by the case pole part is placed at the tip side of the finger, and has
a contour of the finger extracted from the imaging pattern, and
in the imaging region which is not shielded against the outside light by the case pole part, the contour of the finger is extrapolated from the extracted contour of the finger to detect the finger vein pattern.

12. The finger vein pattern inputting device according to claim 9, wherein the width of the case pole part in the lengthwise direction of the finger is less than a dimension of the imaging device in the lengthwise direction of the finger.

* * * * *